United States Patent
Ogura et al.

(10) Patent No.: US 8,827,609 B2
(45) Date of Patent: Sep. 9, 2014

(54) SPINDLE DEVICE FOR MACHINE TOOL

(75) Inventors: Kazunari Ogura, Tsushima (JP);
Nobumitsu Hori, Ichinomiya (JP);
Kunimichi Nakashima, Anjo (JP); Yuji Okawa, Kariya (JP); Takamasa Shibata, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 968 days.

(21) Appl. No.: 12/899,172

(22) Filed: Oct. 6, 2010

(65) Prior Publication Data
US 2011/0081216 A1 Apr. 7, 2011

(30) Foreign Application Priority Data
Oct. 6, 2009 (JP) ................ 2009-232290

(51) Int. Cl.
| B23Q 1/70 | (2006.01) |
|---|---|
| B23Q 11/00 | (2006.01) |
| F16C 25/06 | (2006.01) |
| B23Q 1/26 | (2006.01) |
| F16C 25/08 | (2006.01) |
| B23Q 17/09 | (2006.01) |

(52) U.S. Cl.
CPC .............. *B23Q 1/265* (2013.01); *F16C 25/083* (2013.01); *B23Q 1/70* (2013.01); *B23Q 11/0039* (2013.01); *B23Q 17/0976* (2013.01)
USPC ........... 409/231; 409/233; 409/141; 408/143; 384/517

(58) Field of Classification Search
USPC ............ 409/231, 141, 233; 408/143; 384/517
See application file for complete search history.

(56) References Cited

U.S. PATENT DOCUMENTS

| 3,664,718 | A | 5/1972 | Uhtenwoldt |
|---|---|---|---|
| 6,505,972 | B1 | 1/2003 | Harbottle et al. |
| 2011/0002570 | A1* | 1/2011 | Ogura et al. ................. 384/563 |
| 2011/0020088 | A1* | 1/2011 | Nakashima et al. .......... 409/231 |
| 2012/0109539 | A1* | 5/2012 | Hasegawa et al. .............. 702/34 |

FOREIGN PATENT DOCUMENTS

| DE | 26 30 740 | A1 | 10/1977 |
|---|---|---|---|
| GB | 2105416 | A * | 3/1983 |
| JP | 01-126419 | | 8/1989 |
| JP | 6-8005 | | 1/1994 |
| JP | 2004-150563 | | 5/2004 |
| JP | 2007-44852 | | 2/2007 |
| JP | 2009-14101 | A | 1/2009 |
| WO | WO 02/21004 | A2 | 3/2002 |

OTHER PUBLICATIONS

U.S. Appl. No. 12/829,875, filed Jul. 2, 2010, Ogura, et al.
Office Action issued Oct. 29, 2013 in Japanese Patent Application No. 2009-232290 submitting English translation only.
Extended European Search Report issued on Feb. 1, 2011 in the corresponding European Patent Application No. 10186594.7.
Office Action issued Apr. 1, 2014 in Japanese Patent Application No. 2009-232290 (with partial English Translation).

* cited by examiner

*Primary Examiner* — Erica E Cadugan
(74) *Attorney, Agent, or Firm* — Oblon, Spivak, McClelland, Maier & Neustadt, L.L.P.

(57) ABSTRACT

The damping property of a rear rolling bearing (133) is adjusted by controlling a damping force that is applied by damping application means (5, 134) based on, for example, the type of a tool (T). Thus, it is possible to provide the optimum damping properties for various tools that differ in natural vibration, and to suppress the generation of chattering of the various tools. As a result, it is possible to increase the cut amount per unit time to increase the productivity.

10 Claims, 9 Drawing Sheets

SPINDLE DEVICE FOR MACHINE TOOL

INCORPORATION BY REFERENCE

This application claims priority to Japanese Patent Application No. 2009-232290 filed on Oct. 6, 2009, the disclosure of which, including the specification, drawings and abstract, is incorporated herein by reference in its entirety.

BACKGROUND OF THE INVENTION

1. Field of the Invention

The invention relates to a spindle device used for, for example, a machine tool.

2. Description of the Related Art

A spindle of a spindle device for a machine tool is supported by rolling bearings having high stiffness and high precision in order to increase productivity. However, for example, in a machining center, workpieces are machined with the use of various tools such as a milling cutter, an endmill and a boring tool. Therefore, generated cutting resistance varies depending on the tools. Further, many factors such as stiffness and weights of tools, rotation speeds of spindles, feedrates and feed amounts (hereinafter, referred also to as "depths of cut" where appropriate) vary. Accordingly, in a spindle that is supported by rolling bearings having high stiffness, so-called chattering may be generated if some types of tools are used.

To address this problem, for example, Japanese Patent Application Publication No. 2007-44852 (JP-A-2007-44852) suggests a spindle device with which the generation of chattering during machining is suppressed by changing the machining conditions. That is, the relationship between the rotation speed of a spindle and the upper limit of feed amounts of a tool (depths of cut formed by a tool), at which chattering is not generated, is obtained in advance, and the rotation speed of the spindle or the feed amount of the tool is changed to suppress the generation of chattering during machining. However, the relationship between the rotation speed of the spindle and the upper limit of feed amounts varies depending on, for example, types of tools and materials of workpieces. In addition, this relationship varies depending on the degree of deterioration, for example, abrasion of the tool. Therefore, the machining conditions are changed based on skills and experiences of workers in many cases. Accordingly, it is not easy to appropriately change the machining conditions.

Regenerative chatter, which is one type of chattering, is generated due to natural vibration of a mechanical system, and the generation limit of the regenerative chatter is determined by the dynamic stiffness (compliance). Therefore, it is difficult to greatly change the generation limit of the regenerative chatter by just changing the stiffness, and a damping property needs to be provided. Therefore, Japanese Patent Application Publication No. 2004-150563 suggests a spindle device in which a rear end portion of a spindle is supported by a bearing that has a damper portion to provide a damping property. With this configuration, the generation of vibration due to resonance is suppressed. Japanese Patent Application Publication No. 6-8005 (JP-A-6-8005) suggests a spindle device in which a front end portion of a spindle is supported by a hydrostatic bearing formed of a static pad and an orifice to provide a damping property. The vibration of the spindle is detected by a vibration sensor, and the hydraulic pressure that is supplied to the hydrostatic bearing is regulated by a pressure-regulating valve. With this configuration, the generation of chattering during machining is suppressed.

In the spindle device described in JP-A-2004-150563, the damper portion damps the vibration due to resonance at a certain frequency, that is, the vibration due to resonance generated by a certain type of tool. Therefore, it is difficult to suppress the generation of vibrations due to resonances of various tools. In the spindle device described in JP-A-6-8005, the hydraulic pressure that is supplied to the hydrostatic bearing is regulated based only on the vibration of the spindle. Therefore, stabilities of the machining condition and the spindle state are not secured. Accordingly, there is a limit to improvement of the machining accuracy. Further, the damping property can be changed only roughly because only the hydraulic pressure that is supplied to the hydrostatic bearing is regulated. Therefore, it is difficult to suppress the generation of chattering of various tools.

SUMMARY OF INVENTION

The invention is made in the light of above-described circumstances. An object of the invention is to provide a spindle device for a machine tool, with which the generation of chattering of various tools is suppressed.

According to a feature of an example of the invention, the damping property of a rear rolling bearing is adjusted by controlling a damping force that is applied by damping application means based on, for example, the type of a tool. Thus, it is possible to provide the optimum damping properties for various tools that differ in natural vibration, and to suppress the generation of chattering of the various tools. As a result, it is possible to increase the cut amount per unit time to increase the productivity.

According to another feature of an example of the invention, in addition to the damping force that is applied by the damping application means, a preload that is applied by preload application means is controlled based on, for example, the type of the tool. Therefore, it is possible to adjust the stiffness of a front rolling bearing in addition to the damping property of the rear rolling bearing. Therefore, it is possible to suppress the generation of chattering during machining performed using various tools. As a result, it is possible to increase the cut amount per unit time to increase the productivity.

According to a further feature of an example of the invention, a hydrostatic bearing is provided as the damping application means. Therefore, it is possible to execute controls with high accuracy. As a result, it is possible to suppress the generation of chattering during machining performed using various tools.

According to another feature of the invention, by way of example, a pressure ratio of the hydrostatic bearing and a supply hydraulic pressure are controlled. Therefore, it is possible to accurately adjust the damping property. In addition, it is possible to adjust the stiffness through the control of the pressure ratio. As a result, it is possible to suppress the generation of chattering during machining performed using various tools.

Further by way of example, according to another aspect of the invention, for example, the damping force that is applied by the damping application means is controlled based on, for example, the rotation speed of the spindle. Therefore, it is possible to simplify the configuration of the control means.

According to a further feature of an example of the invention, for example, the type of the tool may be stored in the NC program in advance. Therefore, it is possible to further simplify the configuration of the control means.

According to a further feature of an example of the invention, it is possible to highly accurately detect, for example, the rotation speed of the spindle using the sensor. Therefore, it is possible to further simplify the configuration of the control means.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EXAMPLE EMBODIMENTS

Hereinafter, embodiments of the invention will be described with reference to the accompanying drawings.

Figure 1A:
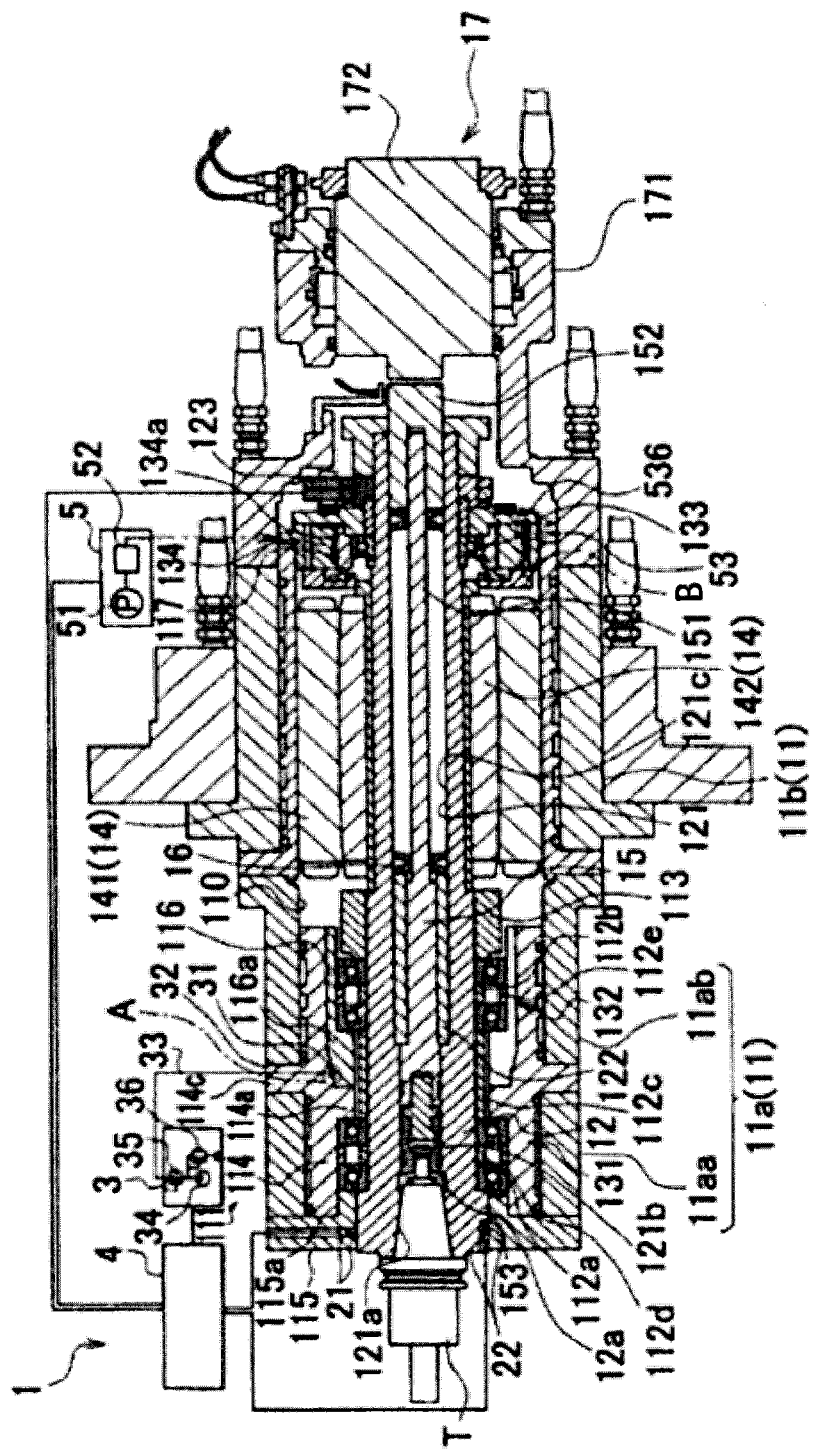
FIG. 1(A) is a longitudinal sectional view that shows the overall structure of a spindle device according to an embodiment of the invention.
Figure 1B:
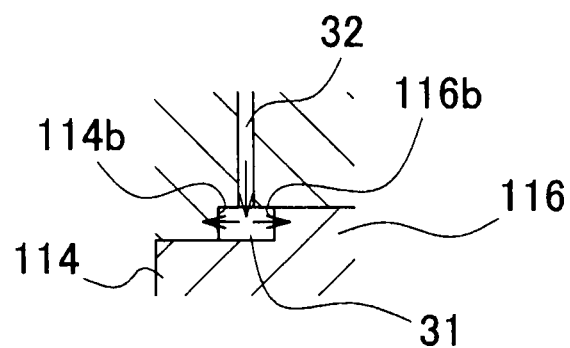
FIG. 1(B) is an enlarged sectional view of a portion A shown in FIG. 1(A)
Figure 2:
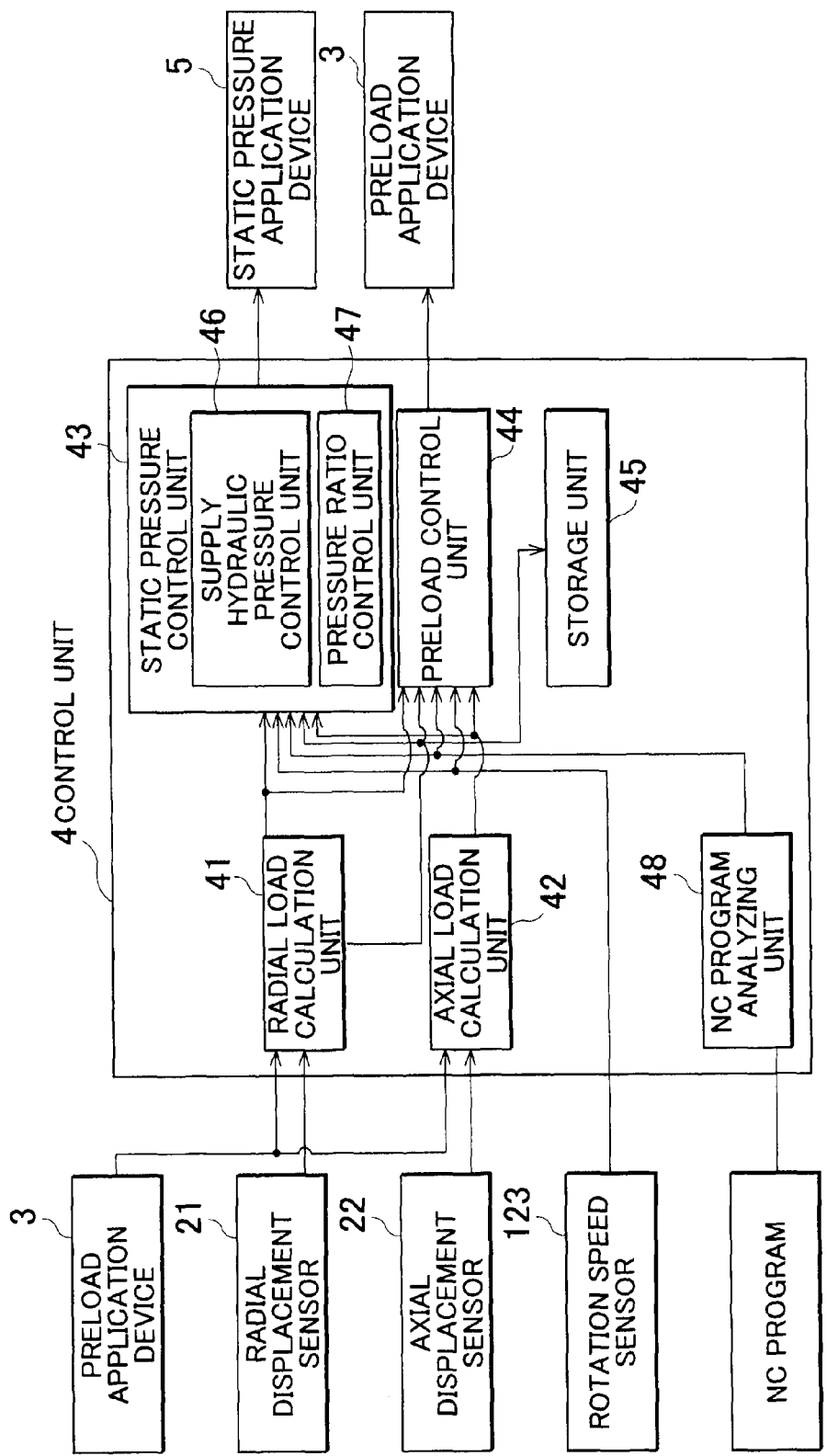
FIG. 2 is a block diagram of a control unit of the spindle device in FIG. 1(A)

FIG. 1(A) is a longitudinal sectional view that shows the overall structure of a spindle device 1 according to an embodiment of the invention. FIG. 1(B) is an enlarged sectional view of a portion A shown in FIG. 1(A). FIG. 2 is a block diagram of a control unit of the spindle device 1 in FIG. 1(A). Note that, in FIG. 1(A), the lateral direction is an axial direction, and the left side is defined as a front side. As shown in FIG. 1(A), the spindle device 1 according to the present embodiment includes a substantially cylindrical spindle housing 11, a spindle 12, a pair of first front rolling bearings 131, a pair of second front rolling bearings 132 and a rear rolling bearing 133. The spindle housing 11 has an accommodating space 110 inside its inner peripheral portion. The spindle 12 is arranged in the accommodating space 110. The pair of first front rolling bearings 131 and the pair of second front rolling bearings 132 support a front portion of the spindle 12. The rear rolling bearing 133 supports a rear portion of the spindle 12.

Furthermore, the spindle device 1 includes a preload application device 3 (that corresponds to "preload application means" according to the invention), a hydrostatic bearing 134 (that corresponds to "damping application means" according to the invention), a static pressure application device 5 (that corresponds to "damping application means" according to the invention), and a control unit 4. The preload application device 3 applies an axial preload to the first and second front rolling bearings 131 and 132. The hydrostatic bearing 134 supports the rear rolling bearing 133. The static pressure application device 5 applies hydraulic pressure to the hydrostatic bearing 134. The control unit 4 controls the preload application device 3 and the static pressure application device 5.

As will be described later in detail, the control unit 4 is provided with load sensors that detect loads that are applied to the spindle 12. In the present embodiment, the control unit 4 is provided with a radial displacement sensor 21 that detects a radial displacement of the spindle 12, and an axial displacement sensor 22 that detects an axial displacement of the spindle 12. Each of the radial displacement sensor 21 and the axial displacement sensor 22 is used as a load sensor. The load that is applied to the spindle 12 is detected through a process described later in detail. In addition, the control unit 4 is provided with a rotation speed sensor 123 that detects a rotation speed of the spindle 12.

A rod hole 121 is formed at the rotation axis center of the spindle 12. The rod hole 121 extends in the axial direction. The rod hole 121 passes through the spindle 12 in the axial direction. The rod hole 121 has a tool hold taper portion 121a at its front end. A collet accommodating portion 121b is formed behind the tool hold taper portion 121a. A spring accommodating hole 121c having a diameter larger than that of the collet accommodating portion 121b is formed behind the collet accommodating portion 121b. A sleeve 122 is fixed to the front end portion of the spring accommodating hole 121c. A rod 15 is accommodated in the rod hole 121 so as to be movable in the axial direction. A stopper 152 having a diameter larger than that of a long shaft member 151 is secured to the rear end portion of the shaft member 151 of the rod 15. Furthermore, a collet 153 is attached to the front end of the rod 15. The collet 153 is radially expandable and contractible, and is formed to be able to hold a tool T.

In a state where the rod 15 is accommodated in the rod hole 121, the front end portion of the shaft member 151 is slidable over the inner peripheral surface of the sleeve 122, and the stopper 152 is slidable in the spring accommodating hole 121c. In addition, a plurality of belleville springs 16 are interposed between the rear end portion of the sleeve 122 and the front end surface of the stopper 152 inside the spring accommodating hole 121c. The rod 15 is constantly urged rearward with respect to the spindle 12. A hydraulic cylinder 17 is provided behind the spindle 12. The hydraulic cylinder 17 includes a cylinder housing 171 and a piston 172. The cylinder housing 171 is integrated with the spindle housing 11. The piston 172 is provided in the cylinder housing 171 so as to be axially movable. As the piston 172 moves rearward to release engagement between the piston 172 and the rod 15, the rod 15 holding the tool T with the collet 153 recedes with respect to the spindle 12 by the urging force of the belleville springs 16. Then, the tool T is fixed to the spindle 12 in such a manner that the tool T is fitted into the tool hold taper portion 121a of the spindle 12. As the piston 172 moves frontward to be engaged with the rod 15, the rod 15 holding the tool T advances with respect to the spindle 12 against the urging force of the belleville springs 16. Then, the collet 153 radially expands to release the tool T.

The first and second front rolling bearings 131 and 132 are angular contact bearings, and are arranged side by side in the axial direction at the front side in the accommodating space 110 of a front spindle housing 11a. The rear rolling bearing 133 is a cylindrical roller bearing, and is arranged at the rear side in the accommodating space 110. The first and second front rolling bearings 131 and 132 support the front side portion, adjacent to the tool T, of the spindle 12. The rear rolling bearing 133 supports the rear side portion that is behind the front side portion of the spindle 12 with respect to the tool T. Cylindrical spacers 112a, 112b and 112c are respectively arranged between the inner rings of the pair of first front rolling bearings 131, between the inner rings of the pair of second front rolling bearings 132 and between the inner ring of the first front rolling bearing 131 and the inner ring of the second front rolling bearing 132. The outer peripheral surface of the spindle 12 is fitted to the inner peripheral portions of the first front rolling bearings 131, second front rolling bearings 132 and spacers 112a, 112b and 112c. Then, the inner ring of the frontmost first front rolling bearing 131 is in contact with a flange portion 12a formed at the front end of the spindle 12. A cylindrical inner ring retainer 113 is in contact with the inner ring of the rearmost second front rolling bearing 132. The inner ring retainer 113 is screwed onto the outer peripheral surface of the spindle 12. Thus, the first front rolling bearings 131, the second front rolling bearings 132 and the spacers 112a, 112b and 112c are fixed to the outer peripheral surface of the spindle 12.

Cylindrical spacers 112d and 112e are respectively arranged between the outer rings of the pair of first front rolling bearings 131 and between the outer rings of the pair of second front rolling bearings 132. The first front rolling bearings 131, the second front rolling bearings 132 and the spacers 112d and 112e are supported by a bearing support cylinder 111. The bearing support cylinder 111 is formed of a substantially cylindrical sleeve 114, a substantially annular outer ring retainer 115 and a substantially cylindrical piston 116.

A circumferential protrusion 114a is formed at a substantially center of the inner peripheral portion of the sleeve 114. The circumferential protrusion 114a protrudes inward. A flange portion 114c is formed at a substantially center of the outer peripheral portion of the sleeve 114. The flange portion 114c protrudes outward. The inside diameter of the inner peripheral portion of the sleeve 114, which is in front of the circumferential protrusion 114a, is substantially equal to the outside diameter of each first front rolling bearing 131 and the outside diameter of the spacer 112d. The inside diameter of the inner peripheral portion of the sleeve 114, which is behind the circumferential protrusion 114a, is substantially equal to the outside diameter of the piston 116. The outside diameter of the outer peripheral portion of the sleeve 114, which is in front of the flange portion 114c, is substantially equal to the inside diameter of one of the two-piece front spindle housings 11a (first front spindle housing 11aa). The outside diameter of the outer peripheral portion of the sleeve 114, which is behind the flange portion 114c, is substantially equal to the inside diameter of the other one of the two-piece front spindle housings 11a (second front spindle housing 11ab).

A boss portion 115a is formed on one end surface of the outer ring retainer 115. The boss portion 115a axially protrudes from the end surface. The outside diameter of the boss portion 115a of the outer ring retainer 115 is substantially equal to the inside diameter of the inner peripheral portion of the sleeve 114, which is in front of the circumferential protrusion 114a (outside diameter of each first front rolling bearing 131 and the outside diameter of the spacer 112d). The outside diameter of the outer ring retainer 115 is substantially equal to the outside diameter of the first front spindle housing 11aa. A circumferential protrusion 116a is formed on the inner peripheral portion of the front side portion of the piston 116. The circumferential protrusion 116a protrudes inward. The inside diameter of the inner peripheral portion of the piston 116, which is behind the circumferential protrusion 116a, is substantially equal to the outside diameter of each second front rolling bearing 132 and the outside diameter of the spacer 112e.

Then, the first front rolling bearings 131 and the spacer 112d are fitted to the inner peripheral portion of the sleeve 114, which is in front of the circumferential protrusion 114a. The second front rolling bearings 132 and the spacer 112e are fitted to the inner peripheral portion of the piston 116, which is behind the circumferential protrusion 116a. Then, the outer peripheral surface of the piston 116 is fluid-tightly fitted to the inner peripheral portion of the sleeve 114, which is behind the circumferential protrusion 114a. The first front spindle housing 11aa is fitted to the outer peripheral portion of the sleeve 114, which is in front of the flange portion 114c. The second front spindle housing 11ab is fitted to the outer peripheral portion of the sleeve 114, which is behind the flange portion 114c.

In this way, the outer ring of the first front rolling bearing 131 located at the front side is in contact with the boss portion 115a of the outer ring retainer 115, and the outer ring of the first front rolling bearing 131 located at the rear side is in contact with the circumferential protrusion 114a of the sleeve 114. The outer ring of the second front rolling bearing 132 located at the front side is in contact with the circumferential protrusion 116a of the piston 116, and the outer ring of the second front rolling bearing 132 located at the rear side is provided so as to be movable rearward in the axial direction by the piston 116, together with the outer ring of the second front rolling bearing 132 located at the front side and the spacer 112e. Then, the sleeve 114, the first front spindle housing 11aa, the second front spindle housing 11ab and the outer ring retainer 115 are integrally fastened to one another by bolts (not shown) that are extended through from the front end surface of the outer ring retainer 115. The second front spindle housing 11ab is integrally fastened to the rear spindle housing 11b by bolts (not shown). The rear spindle housing 11 b accommodates a built-in motor 14.

As shown in the enlarged sectional view of the portion A in FIG. 1(B), a step 116b formed by a small-diameter portion and a large-diameter portion is formed in the outer peripheral surface of the front side portion of the piston 116, and a step 114b is formed in the inner peripheral surface of the sleeve 114, which is behind the circumferential protrusion 114a. The step 114b is formed by a small-diameter portion and a large-diameter portion. The small-diameter portion and large-diameter portion of the piston 116 may be respectively fitted to the large-diameter portion and small-diameter portion of the sleeve 114. Then, an annular hydraulic cylinder 31 is formed between the steps 116b and 114b. An oil passage 32 is in fluid communication with the hydraulic cylinder 31. The oil passage 32 is perforated from the outer peripheral surface of the flange portion 114c formed at the substantially center of the outer peripheral side of the sleeve 114. A conduit 33 connected to the preload application device 3 is connected to the oil passage 32.

The preload application device 3 is formed of a hydraulic pump 34, a pressure reducing valve 35 and a pressure relief valve 36. The preload application device 3 is controlled by the control unit 4 to supply the hydraulic cylinder 31 with hydraulic pressure. That is, the maximum hydraulic pressure applied from the hydraulic pump 34 is controlled by the pressure relief valve 36, and then a selected hydraulic pressure within the range up to the maximum hydraulic pressure is controlled by the pressure reducing valve 35 and supplied to the hydraulic cylinder 31 via the conduit 33 and the oil passage 32. Thus, hydraulic pressure in the axial direction (forward or rearward) is generated in the hydraulic cylinder 31, and the piston 116 is pressed rearward to press the outer ring of one of the second front rolling bearings 132. Therefore, a preload is applied to the second front rolling bearings 132. In addition, the spindle 12 moves rearward to press the inner ring of one of the first front rolling bearings 131, so a preload is also applied to the first front rolling bearings 131.

The hydrostatic bearing 134 is fitted to the outer periphery of a sleeve 117 fitted to the outer ring of the rear rolling bearing 133. Pockets 134a are formed in the inner peripheral surface of the hydrostatic bearing 134 at regular angle intervals. Each pocket 134a is a rectangular or U-shaped recessed portion. An oil supply hole opens at the bottom face of the pocket 134a. In addition, oil discharge grooves are formed on respective sides of the pocket 134a. The oil flows into the space in the pocket 134a from the oil supply hole, fills the space defined by the pocket 134a and the outer peripheral surface of the sleeve 117 to generate a static pressure, flows into the oil discharge grooves after the flow rate is increased between the inner peripheral surface of the hydrostatic bearing 134 and the outer peripheral surface of the sleeve 117, and is discharged to the outside.

The static pressure application device 5 is formed of a hydraulic pump 51, a pressure-regulating valve 52, and a variable orifice (not shown) that is provided near the oil supply hole that leads to the pocket 134a. The static pressure application device 5 supplies hydraulic pressure to the hydrostatic bearing 134 under the control executed by the control unit 4. That is, the hydraulic pressure supplied from the hydraulic pump 51 is regulated by the pressure-regulating valve 52, and is supplied from an oil supply hole 54 to the pocket 134a through the oil supply hole formed in the hydrostatic bearing 134. At this time, the pressure ratio (the inner pressure in the pocket 134a of the hydrostatic bearing 134/the pressure supplied from the hydraulic pump 51) is adjusted by the variable orifice embedded in the hydrostatic bearing 134. Thus, the damping property of the hydrostatic bearing 134 is adjusted. As the variable orifice, an existing orifice of which the opening amount can be changed using, for example, a diaphragm or a piezoelectric element may be used.

Figure 1C:
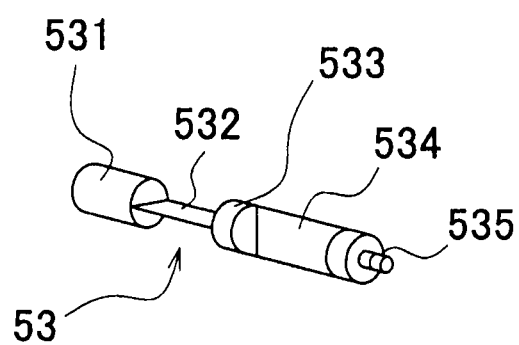
FIG. 1(C) is an enlarged perspective view of a portion B shown in FIG. 1(A)

A rotation stopper 53 shown in an enlarged perspective view (FIG. 1(C)) of a portion B in FIG. 1(A) has a cylindrical pin portion 531, a first leaf spring 532 that extends from a side surface of the pin portion 531, a second leaf spring 534 that extends from an end of the first leaf spring 532 via a cylindrical member 533, and a cylindrical screw member 535 that is arranged at an end of the second leaf spring 534. The first leaf spring 532 is arranged so as to be offset from the second leaf spring 534 by an angle of 90°. The rotation stopper 53 is provided in a through-hole that extends through the hydrostatic bearing 134 in the axial direction in such a manner that the screw member 535 projects from the hydrostatic bearing 134. A nut 536 is screwed to the screw member 535 so that the rotation is prohibited. The thus structured rotation stopper 53 has a function of restricting the sleeve 117 from rotating with respect to the housing 11. If the rotation stopper 53 is formed of a rigid body, the sleeve 117 is not only restricted from rotating but also hindered from moving in the radial direction. Therefore, the first leaf spring 532 and the second leaf spring 534, which are orthogonal to each other, are used so that the rotation stopper 53 does not hinder the sleeve 117 from moving in the radial direction.

A stator 141 of the built-in motor 14 is secured to the inner peripheral surface of the spindle housing 11. A rotor 142 formed on the outer peripheral surface of the spindle 12 is located on the radially inner side of the stator 141 so as to face the stator 141. As electric power is supplied to the built-in motor 14 formed of the stator 141 and the rotor 142, the spindle 12 rotates together with the rotor 142. The spindle device 1 rotates the spindle 12 in a state where the tool T is attached to the distal end of the spindle 12 to thereby machine a workpiece (not shown). The rotation speed of the spindle 12 is detected by the noncontact speed sensor 123 arranged at the rear side portion of the spindle 12.

The radial displacement sensor 21 is a noncontact sensor that detects a radial displacement of the spindle 12. The axial displacement sensor 22 is a noncontact sensor that detects an axial displacement of the spindle 12. The radial displacement sensor 21 is provided in a hole that extends from the outer peripheral surface of the outer ring retainer 115 in the radial direction. The axial displacement sensor 22 is provided in a groove that extends from the front end surface of the outer ring retainer 115 in the axial direction along the inner peripheral surface of the outer ring retainer 115. Preferably, the radial displacement sensor 21 is arranged at a position that is in front of the first front rolling bearings 131 and that is as close to the tool T as possible. In addition, preferably, openings of the groove and the hole are blocked so that the displacement sensors 21 and 22 are not influenced by a coolant. As a sensor that directly detects a load, for example, a force sensor may be used instead of the axial displacement sensor 22.

As shown in FIG. 2, the control unit 4 includes a radial load calculation unit 41, an axial load calculation unit 42, a static pressure control unit 43, a preload control unit 44, a storage unit 45, and a NC program analyzing unit 48. The radial load calculation unit 41 and the axial load calculation unit 42 calculate, as loads that are applied to the spindle 12, a radial load and an axial load that are applied to a pair of the first front rolling bearings 131, a pair of the second front rolling bearings 132 and the rear rolling bearing 133 based on the value detected by the radial displacement sensor 21 and the value detected by the axial displacement sensor 22, respectively. The static pressure control unit 43 controls a static pressure that is applied to the hydrostatic bearing 134 by the static pressure application device 5 based on the type of a tool or the machining condition for the tool, and the loads calculated by the load calculation units 41 and 42. The preload control unit 44 controls preloads that are applied to the front rolling bearings 131 and 132 by the preload application device 3. The storage unit 45 stores various data. The NC program analyzing unit 48 receives and interprets a NC program.

The storage unit 45 stores: a data table of the optimum damping force and preload (hereinafter, referred to as "damping force-preload table") that is prepared based on the type of the tool T and the machining condition for the tool T, for example, the rotation speed of the spindle 12, the feedrate of the tool T with respect to a workpiece, the feed amount of the tool T (depth of cut formed in the workpiece by the tool T); a data table that indicates the relationship between the load that is applied to the spindle 12 and the displacement of the spindle 12, which is obtained in advance (hereinafter, referred to as "load-displacement table"); a data table that indicates the relationship between the rotation speed of the spindle 12 and the upper limit of loads at which chattering is not generated (upper limit load) (hereinafter, referred to as "rotation speed-upper limit load table"); and a data table that indicates the relationship between the rotation speed of the spindle 12 and the preload that is applied by the preload application device 3 (hereinafter, referred to as "rotation speed-preload table").

Figure 3:
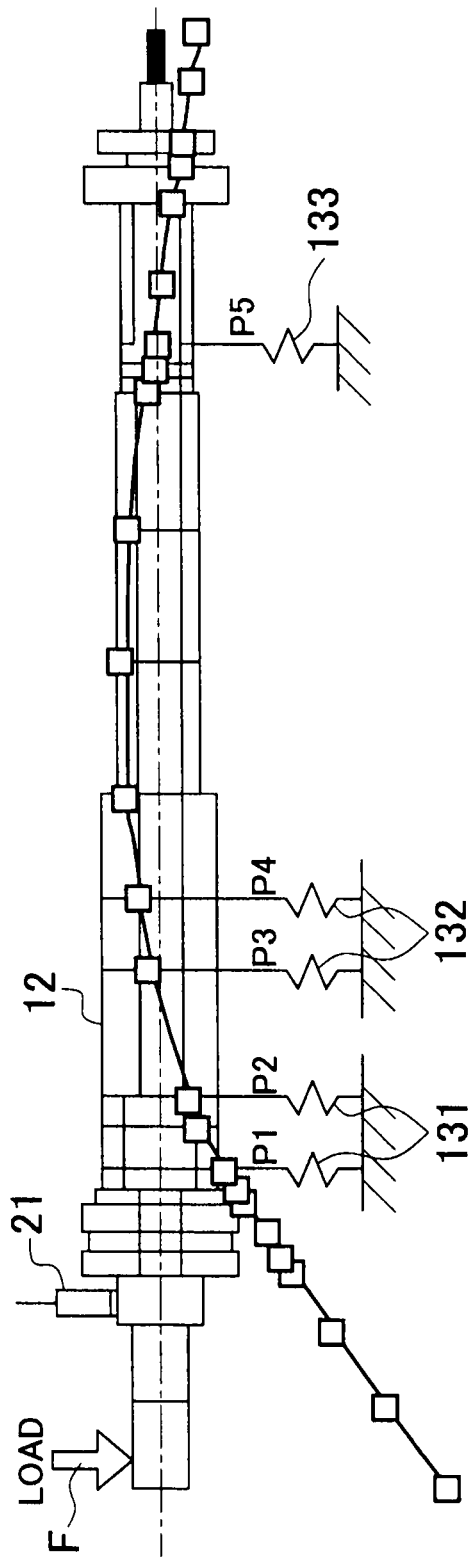
FIG. 3 is a table formulated by modeling the shape of the spindle, the positions of bearings, and the stiffness of each of the bearings.

As shown in FIG. 3, the load-displacement table is formulated by modeling the shape of the spindle 12, the positions of the bearings 131, 132 and 133 and the stiffness of each of the bearings 131, 132 and 133. The displacements of the bearings 131, 131, 132, 132 and 133 at the arrangement positions P1, P2, P3, P4 and P5 are determined based on the radial displacement of the spindle 12 that is caused when a radial load (F) is applied to the spindle 12 and that is detected by the radial displacement sensor 21, by analyzing the model by the transfer matrix method. The radial loads that are applied to the bearings 131, 132 and 133 are determined based on the displacements of the bearings 131, 132 and 133, and a preload that is applied in the radial direction among the preloads applied by the preload application device 3 is added to each of the loads determined, whereby the radial loads that are ultimately applied to the bearings 131, 132 and 133 are determined. Therefore, it is possible to accurately determine the radial loads and axial loads that are applied to the bearings 131, 132 and 133 that support the spindle 12 during machining performed with the use of the tool T.

Figure 4:
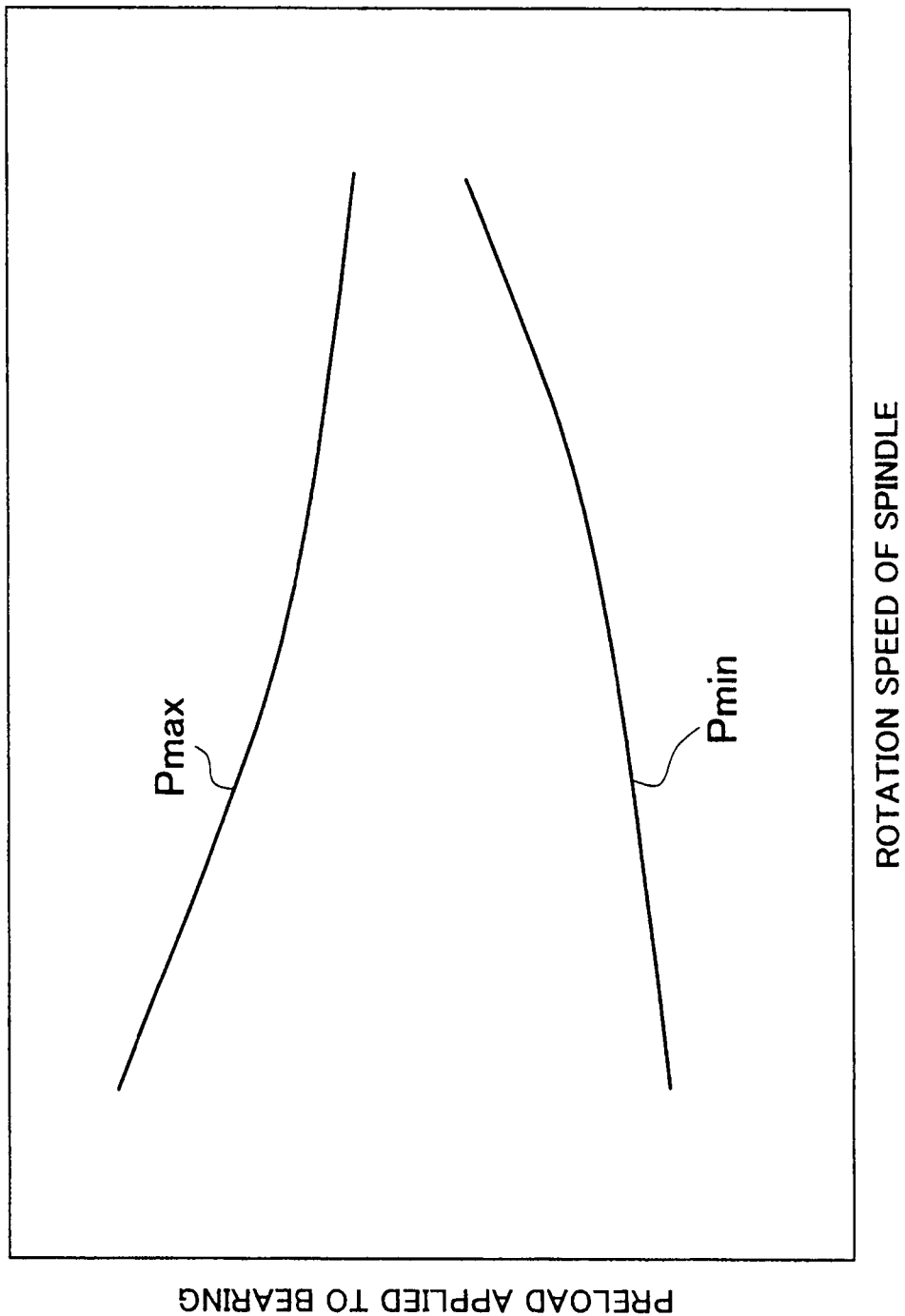
FIG. 4 is a graph that sets the maximum preload at which the bearing is able to normally support the spindle and the minimum preload at which the spindle is able to normally rotate for each rotation speed of the spindle.

As shown in FIG. 4, in the rotation speed-preload table, the maximum preload Pmax at which the first and second front rolling bearings 131 and 132 are able to normally support the spindle 12 and the minimum preload Pmin at which the spindle 12 is able to normally rotate are set for each rotation speed of the spindle 12, and the region between the maximum preload Pmax and the minimum preload Pmin is set as a controllable region for the preload application device 3. The maximum preload Pmax decreases as the rotation speed of the spindle 12 increases. The minimum preload Pmin increases as the rotation speed of the spindle 12 increases. The maximum preload Pmax set for each rotation speed of the spindle 12 is a limit value at which the stiffness of the first and second front rolling bearings 131 and 132 is ensured and the stiffness of the spindle 12 is maximally increased. The minimum preload Pmin set for each rotation speed of the spindle 12 is a limit value at which heating and excessive increase in contact pressure of the first and second front rolling bearings 131 and 132 are prevented to make it possible to maximally extend the service life of the first and second front rolling bearings 131 and 132.

The radial load calculation unit 41 reads the load-displacement table from the storage unit 45, analyzes the radial displacement of the spindle 12 detected by the radial displacement sensor 21 by the transfer matrix method, and adds the preload applied by the preload application device 3 to each of the radial loads applied to the bearings 131, 132 and 133 derived through the analysis, thereby determining the radial loads that are ultimately applied to the bearings 131, 132 and 133. The axial load calculation unit 42 executes a calculation according to the Hooke's law using the axial displacement of the spindle 12 detected by the axial displacement sensor 22, and adds the preload applied by the preload application device 3 to each of the axial loads applied to the bearings 131, 132 and 133 derived through the calculation, thereby determining the axial loads that are ultimately applied to the bearings 131, 132 and 133 (the loads applied to the bearings 131, 132 and 133 are equal to each other).

The static pressure control unit 43 includes a supply hydraulic pressure control unit 46 and a pressure ratio control unit 47. The static pressure control unit 43 controls the hydraulic pressure that is supplied to the hydrostatic bearing 132 and the pressure ratio by controlling the pressure-regulating valve 52 of the static pressure application device 5 and the variable orifice with reference to the damping force-preload table stored in the storage unit 45 and based on the type of the tool T or the machining condition for the tool T. Alternatively, the static pressure control unit 43 determines, based on the rotation speed-upper limit load table read from the storage device 45, whether the loads that are applied to the spindle 12, which are received from the load calculation units 41 and 42, are appropriate with respect to the rotation speed of the spindle 12 that is detected by the rotation speed sensor 123. Then, the static pressure control unit 43 controls the pressure-regulating valve 52 of the static pressure application device 5 and the variable orifice to control the hydraulic pressure that is supplied to the hydrostatic bearing 134 and the pressure ratio.

The preload control unit 44 controls the pressure reducing valve 35 and the pressure relief valve 36 to control the preload that is applied by the preload application device 3 with reference to the damping force-preload table stored in the storage unit 45 and based on the type of the tool T or the machining condition for the tool T. Alternatively, the preload control unit 44 determines, based on the rotation speed-upper limit load table read from the storage unit 45, whether the loads that are applied to the spindle 12, which are received from the load calculation units 41 and 42, are appropriate with respect to the rotation speed of the spindle 12 that is detected by the rotation speed sensor 123. Then, the preload control unit 44 controls the pressure-regulating valve 35 and the pressure relief valve 36 to control the pressure that is applied by the preload application device within a range of preloads, which is read from the storage unit 45.

Figure 5:
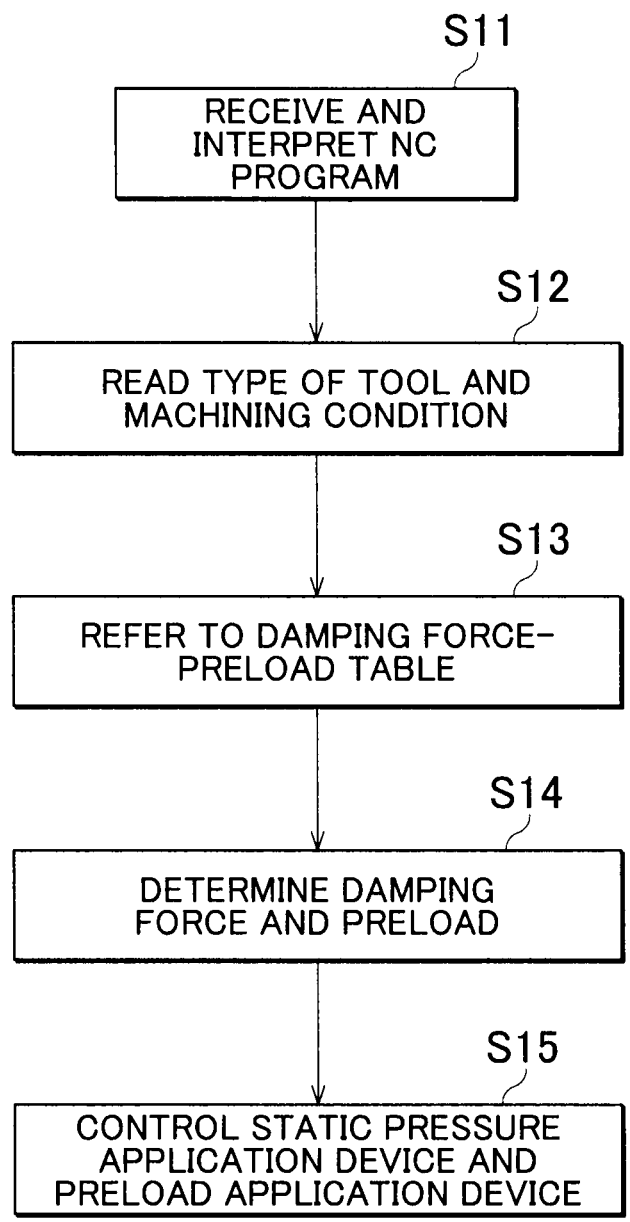
FIG. 5 is a flowchart illustrating a first operation of the control unit in FIG. 2.

A first operation of the control unit 4 in the thus configured spindle device 1 will be described with reference to the flowchart shown in FIG. 5. First, the control unit 4 receives and interprets the NC program (S11), and reads the type of the tool T and the machining condition for the tool T (S12). Then, with reference to the damping force-preload table stored in the storage unit 45 (S13), the optimum damping force and preload are determined based on at least one of the type of the tool T and the machining condition for the tool T (S14). Then, the control unit 4 controls the static pressure application device 5 and the preload application device 3 so that the determined damping force and the determined preload are applied by the static pressure application device 5 and the preload application device 3, respectively (S15).

Figure 6:
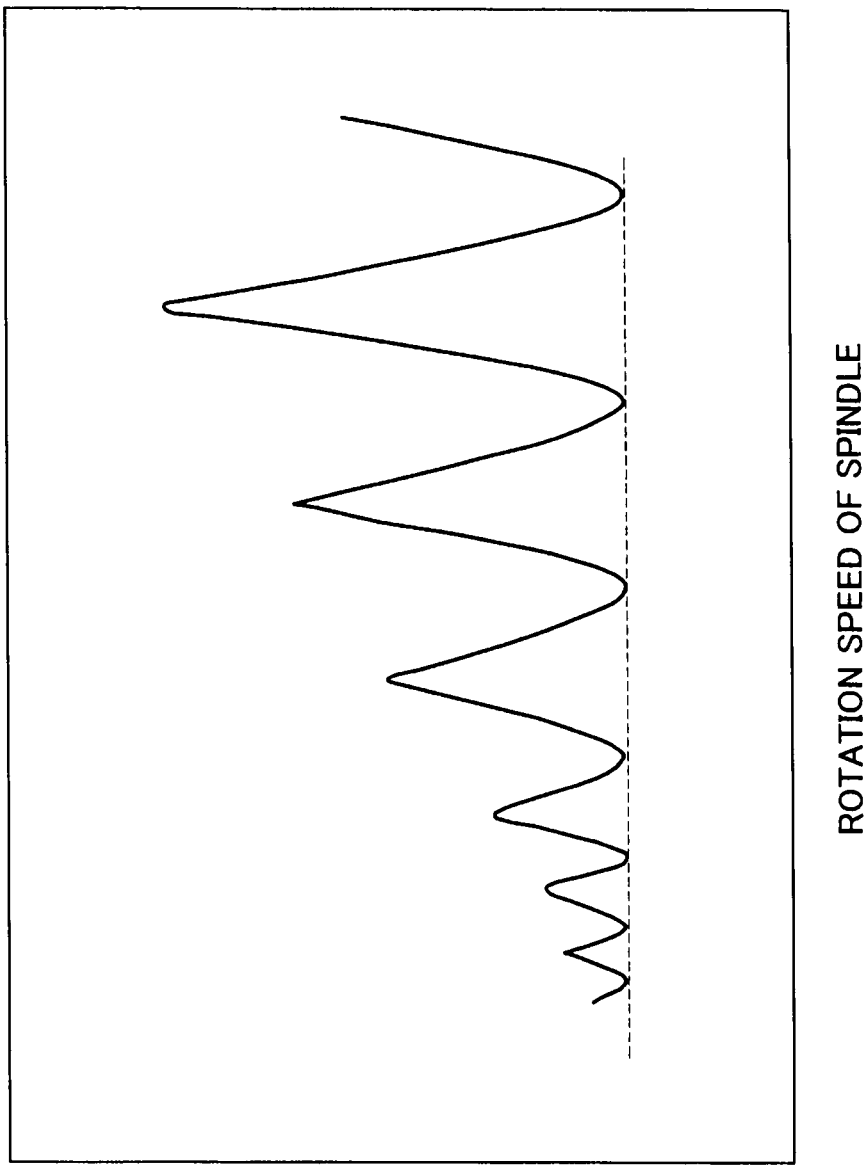
FIG. 6 is a graph showing the upper limit of feed amounts (depths of cut formed in a workpiece by a tool), at which chattering is not generated, for each rotation speed of the spindle.

FIG. 6 is a graph showing the relationship between the rotation speed of the spindle 12 and the feed amount of the tool T (depth of cut formed in the workpiece by the tool T). The region above the solid line in FIG. 6 is an unstable region where chattering is generated. The region below the solid line in FIG. 6 is a stable region where chattering is not generated. That is, the solid line in FIG. 6 represents the stability limit diagram. The region below the dashed line in FIG. 6 is an absolutely stable region where chattering is never generated even if the rotation speed of the spindle 12 is changed. Conventionally, when the feed amount of the tool T (depth of cut formed in the workpiece by the tool T) with respect to the rotation speed of the spindle 12 is in the unstable region, the machining condition is changed so that the above-described feed amount of the tool T falls within the stable region.

However, the stability limit diagram varies depending on the types of the tools T. Therefore, according to the embodiment, the stability limit diagram itself is changed by controlling the damping force and the preload so that the feed amount of the tool T under the current machining condition falls within the stable region. Thus, it is possible to provide the optimum damping properties for various tools T that differ in natural vibration, and the generation of chattering of various tools T is suppressed. Therefore, it is possible to increase the cut amount per unit time. As a result, it is possible to increase the productivity. The stability limit diagram may be determined based on factors such as the relationship between the rotation speed of the spindle 12 and the feedrate of the tool T with respect to the workpiece instead of the relationship between the rotation speed of the spindle 12 and the feed amount of the tool T.

The controls executed by the static pressure control unit 43 and the preload control unit 44 will be described concretely. For example, when the tool T is an endmill or a boring tool that cuts the workpiece by a large amount in the radial direction, the static pressure control unit 43 executes a control in such a manner that the supply hydraulic pressure deceases and the pressure ratio increases, and the preload control unit 44 executes a control in such a manner that the preload decreases. By providing the damping property in this way, the cutting performance is increased. When the tool T is a drill or a milling cutter in which runout of a cutting edge should be restricted, the static pressure control unit 43 executes a control in such a manner that the supply hydraulic pressure increases and the pressure ratio decreases, and the preload control unit 44 executes a control in such a manner that the preload increases. By providing stiffness in this way, the cutting performance is increased.

When the machining condition for the tool T is a condition under which chattering is promoted, for example, when continuous cutting is performed using the tool T, the static pressure control unit 43 executes a control in such a manner that the supply pressure decreases and the pressure ratio increases, and the preload control unit 44 executes a control in such a manner that the preload decreases. By providing the damping property in this way, the cutting performance is increased. When the machining condition for the tool T is a condition under which chattering is promoted by a large excitation force, for example, when intermittent cutting is performed using the tool T, the static pressure control unit 43 executes a control in such a manner that the supply hydraulic pressure increases and the pressure ratio decreases, and the preload control unit 44 executes a control in such a manner that the preload increases. By providing stiffness in this way, the cutting performance is increased.

Figure 7:
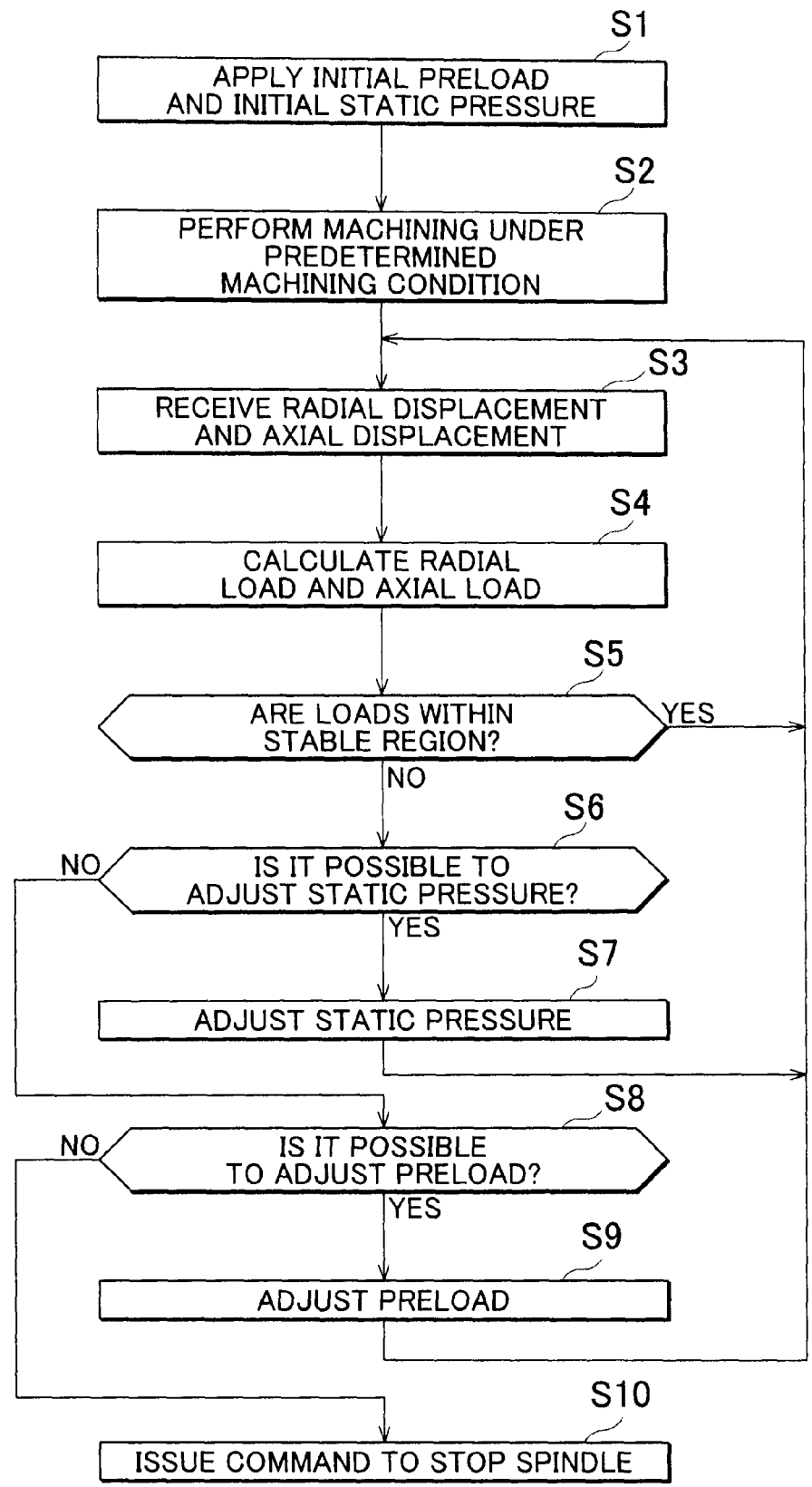
FIG. 7 is a flowchart illustrating a second operation of the control unit in FIG. 2.

Next, a second operation of the control unit 4 will be described with reference to the flowchart shown in FIG. 7. First, the control unit 4 controls the static pressure application device 5 and the preload application device 3 to apply an initial preload, and controls the static pressure application device 5 to apply an initial static pressure (S1). Next, machining of the workpiece is started under the machining condition designated by the NC program (S2). Then, the control unit 4 receives the radial displacement and the axial displacement of the spindle 12 that are detected by the radial displacement sensor 21 and the axial displacement sensor 22, respectively (S3). The radial displacement of the spindle 12 is analyzed with reference to the load-displacement table stored in the storage unit 45 by the transfer matrix method, and the preload is added to each of the radial loads applied to the bearings 131, 132 and 133 that are derived through the analysis, whereby the radial loads that are ultimately applied to the bearings 131, 132 and 133 are determined as the radial load that is applied to the spindle 12. A calculation is executed according to the Hooke's law using the axial displacement of the spindle 12, and the preload is added to each of the axial loads applied to the bearings 131, 132 and 133 derived through the calculation, whereby the axial loads that are ultimately applied to the bearings 131, 132 and 133 are determined as the axial load that is applied to the spindle 12 (S4).

Then, it is determined whether each of the loads applied to the spindle 12, which are calculated by the load calculation units 41 and 42, is within the stable region where chattering is not generated, with reference to the rotation speed-upper limit load table read from the storage unit 45 (S5). If the loads that are applied to the spindle 12, which are calculated by the load calculation units 41 and 42, are within the stable region, the process returns to S3 and machining is continued. On the other hand, if the loads that are applied to the spindle 12, which are calculated by the load calculation units 41 and 42, are out of the stable region, whether it is possible to adjust the static pressure is determined (S6). If it is possible to adjust the static pressure, the pressure-regulating valve 52 and the variable orifice for the hydrostatic bearing 134 are controlled using the static pressure application device 5 to adjust the static pressure (S7). Then, the process returns to S3, and S3 to S5 are executed. When the loads that are applied to the spindle 12, which are calculated by the load calculation units 41 and 42, are brought into the stable region by the control over the static pressure application device 5, the process returns to S3 and machining is continued.

The damping coefficient C of the static pressure is expressed by Equation 1.

$$C = aA^2 P(\mu/k_c) \qquad \text{Equation 1}$$

In Equation 1, a is the area coefficient, A is the area of the bearing, P is the pressure ratio, $\mu$ is the viscosity of lubricant, and $k_c$ is the flow rate coefficient of the orifice.

P in Equation 1 is expressed by the equation, $P=Pr/Ps$.

In this equation, Pr is the inner pressure in the pocket, and Ps is the supply pressure.

Accordingly, it is possible to control the damping force by changing the pressure ratio P itself using the variable orifice or changing the supply pressure Ps.

On the other hand, if it is determined that the loads that are applied to the spindle 12, which are calculated by the load calculation units 41 and 42, are still out of the stable region even after the control over the static pressure application device 5, it is determined in S6 that it is not possible to adjust the static pressure, and the process proceeds to S8 to determine whether it is possible to adjust the preload (S8). If it is possible to adjust the preload, the pressure reducing valve 35 and the pressure relief valve 36 are controlled using the preload application device 3 so that the preload is adjusted within the application preload range in the rotation speed-preload table read from the storage unit 45 (S9), and the process returns to S3 and S3 to S6 are executed. When the loads that are applied to the spindle 12, which are calculated by the load calculation units 41 and 42, are brought into the stable region by the control over the preload application device 3, the process returns to S3 and the machining is continued.

On the other hand, if it is determined that the loads that are applied to the spindle 12, which are calculated by the load calculation units 41 and 42, are still out of the stable region even after the control over the preload application device 3, it is determined in S8 that it is not possible to adjust the preload, and the process proceeds to S10 to issue an abnormality alarm. Thus, a command to stop the spindle 12 is transmitted to a main control unit for the machine tool to terminate all the processes. As described above, the loads are detected during machining and the damping force and the preloads are controlled in the process of machining. Therefore, it is possible to suppress the generation of chattering of the various tools T. Accordingly, it is possible to increase the cut amount per unit time. As a result, it is possible to increase the productivity.

Figure 8:
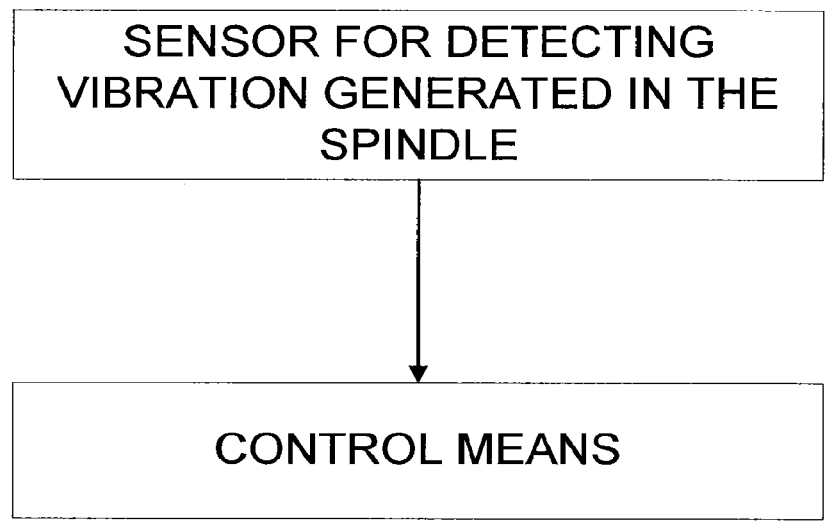
FIG. 8 is a flowchart illustrating a sensor for detecting vibration generated in the spindle.

Even if tools are of the same type, if the tools differ in diameter or length, these tools may be regarded as tools of different types. The machining performance varies depending on the tool manufacturers. Therefore, even if tools are the same in type, length and diameter, if the tools are produced by different manufacturers, the optimum damping force and preload may change depending on the manufacturers. As shown in FIG. 8, the vibration of a spindle that is generated by the machining may be detected in addition to the rotation speed, the machining condition or the load. The vibration may be detected by a vibration sensor, an acceleration sensor, or an AE (acoustic emission) sensor. In the embodiment described above, the hydrostatic bearing 134 and the static pressure application device 5 are used as the damping application means. However, any device may be used as the damping application means, as long as the device is able to apply a damping force.

What is claimed is:

1. A spindle device for a machine tool that includes:
a housing;
a spindle that holds a tool and that is rotationally driven;
a front rolling bearing via which a front portion of the spindle, which is close to the tool, is supported by the housing; and
a rear rolling bearing via which a rear portion of the spindle, which is distant from the tool, is supported by the housing,
the spindle device further comprising:
preload application means for applying a preload to the front rolling bearing;
damping application means for applying a damping force to the rear rolling bearing, the damping application means including a hydrostatic bearing fitted to an outer periphery of a sleeve, which sleeve is fitted to an outer ring of the rear rolling bearing;
a rotation stopper which extends through the hydrostatic bearing to prevent the sleeve from rotating with respect to the housing while permitting movement of the sleeve in a radial direction with respect to a rotation axis of the spindle; and
control means for controlling the damping force that is applied by the damping application means based on at least one of a type of the tool, a machining condition for machining performed using the tool, a load that is applied to the spindle, and a vibration that is generated in the spindle.

2. The spindle device for the machine tool according to claim 1, wherein the control means controls a combination of the preload that is applied by the preload application means and the damping force that is applied by the damping application means based on at least one of the type of the tool, the machining condition for machining performed using the tool, the load that is applied to the spindle, and the vibration that is generated in the spindle.

3. The spindle device for the machine tool according to claim 1, wherein the hydrostatic bearing is provided between the outer ring of the rear rolling bearing and the housing.

4. The spindle device for the machine tool according to claim 3, wherein the control means controls the damping force by adjusting a pressure ratio of an inner pressure in a pocket of the hydrostatic bearing to a supply hydraulic pressure of pressurized oil that is supplied to the hydrostatic bearing.

5. The spindle device for the machine tool according to claim 1, wherein the machining condition includes at least one of a rotation speed of the spindle, a feedrate of the tool with respect to a workpiece, and a depth of cut formed in the workpiece by the tool.

6. The spindle device for the machine tool according to claim 5, further comprising:
a sensor that detects at least one of the rotation speed of the spindle, the load that is applied to the spindle, and the vibration that is generated in the spindle, wherein
a value detected by the sensor is input in the control means.

7. The spindle device for the machine tool according to claim 6, wherein the control means further comprises:
a radial load calculation unit that calculates a radial load applied to the front rolling bearing and the rear rolling bearing based on the sensor that detects the load that is applied to the spindle.

8. The spindle device for the machine tool according to claim 6, wherein the control means further comprises:
an axial load calculation unit that calculates an axial load applied to the front rolling bearing and the rear rolling bearing based on the sensor that detects the load that is applied to the spindle.

9. The spindle device for the machine tool according to claim 6, wherein the control means further comprises:
a static pressure control unit that controls a static pressure that is applied to the hydrostatic bearing.

10. The spindle device for the machine tool according to claim 1, wherein at least one of the type of the tool and the machining condition is interpreted from a numerical-control program based on which the machine tool is controlled, and the at least one of the type of the tool and the machining condition is input in the control means.

* * * * *